(12) United States Patent
Yin

(10) Patent No.: US 12,069,332 B2
(45) Date of Patent: Aug. 20, 2024

(54) VIDEO DATA PROCESSING METHOD, ELECTRONIC DEVICE AND COMPUTER-READABLE MEDIUM

(71) Applicant: BEIJING BYTEDANCE NETWORK TECHNOLOGY CO., LTD., Beijing (CN)

(72) Inventor: Guohui Yin, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 170 days.

(21) Appl. No.: 17/617,563

(22) PCT Filed: Aug. 7, 2020

(86) PCT No.: PCT/CN2020/107728
§ 371 (c)(1),
(2) Date: Dec. 8, 2021

(87) PCT Pub. No.: WO2021/042936
PCT Pub. Date: Mar. 11, 2021

(65) Prior Publication Data
US 2022/0256226 A1    Aug. 11, 2022

(30) Foreign Application Priority Data
Sep. 4, 2019    (CN) .......................... 201910833369.3

(51) Int. Cl.
*H04N 21/435*    (2011.01)
*H04N 21/2187*    (2011.01)
(Continued)

(52) U.S. Cl.
CPC ....... *H04N 21/435* (2013.01); *H04N 21/2187* (2013.01); *H04N 21/4335* (2013.01); *H04N 21/4402* (2013.01)

(58) Field of Classification Search
CPC .......... H04N 21/2187; H04N 21/4335; H04N 21/435; H04N 21/4385; H04N 21/4402;
(Continued)

(56) References Cited

U.S. PATENT DOCUMENTS 8,621,508 B2 * 12/2013 Rowe ................. H04N 21/2381
725/139
8,730,985 B2 *  5/2014 Staniec ................. H04H 60/04
370/537
(Continued)

FOREIGN PATENT DOCUMENTS

CN      103491430 A     1/2014
CN      104023278 A     9/2014
(Continued)

OTHER PUBLICATIONS

Notice of Reasons for Refusal issued Jan. 13, 2023 in Japanese Patent Application No. 2021-574194, with English translation (10 pages).

(Continued)

*Primary Examiner* — Michael B. Pierorazio

(57) ABSTRACT

Disclosed are a video data processing method and apparatus, an electronic device and a computer-readable storage medium. The method includes acquiring a to-be-processed TS file; by means of a created stream, reading data in the to-be-processed TS file in sequence according to a set byte length, and converting data of each read in the to-be-processed TS file into a memory stream; and when the first memory stream is obtained through conversion, parsing memory streams in sequence according to a read order, and obtaining a video parameter corresponding to the memory streams.

16 Claims, 2 Drawing Sheets

(51) Int. Cl.
  H04N 21/4335 (2011.01)
  H04N 21/4402 (2011.01)
(58) Field of Classification Search
  CPC ......... H04N 21/440218; H04N 21/443; H04N 21/845
  See application file for complete search history.

(56) References Cited

U.S. PATENT DOCUMENTS

| | | | | |
|---|---|---|---|---|
| 8,763,029 | B1* | 6/2014 | Haberman | H04N 21/26241 725/38 |
| 9,319,755 | B2* | 4/2016 | Fusco | H04N 21/2381 |
| 2005/0190794 | A1* | 9/2005 | Krause | H04N 21/26216 370/485 |
| 2005/0251843 | A1* | 11/2005 | Walker | H04N 21/4383 348/E7.063 |
| 2009/0187939 | A1* | 7/2009 | Lajoie | H04N 7/17318 725/87 |
| 2010/0106805 | A1* | 4/2010 | Sands, IV | H04N 21/4335 709/219 |
| 2010/0299715 | A1* | 11/2010 | Slothouber | H04N 21/6582 725/118 |
| 2010/0325658 | A1* | 12/2010 | Schlack | H04N 21/26258 725/32 |
| 2011/0015989 | A1* | 1/2011 | Tidwell | G06Q 30/02 705/14.43 |
| 2011/0016479 | A1* | 1/2011 | Tidwell | H04N 21/25891 725/9 |
| 2011/0138414 | A1* | 6/2011 | Koren | H04N 21/858 725/35 |
| 2011/0302600 | A1* | 12/2011 | Kelsen | H04N 21/812 725/32 |
| 2014/0020013 | A1* | 1/2014 | DiLorenzo | G06Q 30/0251 725/32 |
| 2014/0282777 | A1* | 9/2014 | Gonder | H04N 21/2225 725/116 |
| 2015/0039389 | A1* | 2/2015 | Besehanic | H04N 21/251 705/7.29 |
| 2015/0256902 | A1* | 9/2015 | Fusco | H04N 21/25841 725/33 |
| 2017/0070565 | A1* | 3/2017 | Toya | H04N 21/4126 |
| 2018/0176637 | A1* | 6/2018 | Cho | H04N 21/64707 |
| 2018/0255331 | A1* | 9/2018 | McLean | H04L 65/1089 |
| 2020/0037014 | A1* | 1/2020 | Dahl | H04N 19/59 |

FOREIGN PATENT DOCUMENTS

| | | |
|---|---|---|
| CN | 104410901 A | 3/2015 |
| CN | 105025345 A | 11/2015 |
| CN | 105898380 A | 8/2016 |
| CN | 105933799 A | 9/2016 |
| CN | 106358047 A | 1/2017 |
| CN | 107979783 A | 5/2018 |
| CN | 109151494 A | 1/2019 |
| CN | 110545472 A | 12/2019 |
| JP | 2006128907 A | 5/2006 |
| JP | 2015220745 A | 12/2015 |
| JP | 2017130925 A | 7/2017 |
| WO | 2007007526 A1 | 1/2007 |
| WO | 2009128246 A1 | 10/2009 |
| WO | 2010023828 A1 | 3/2010 |

OTHER PUBLICATIONS

Chinese Patent Application No. 201910833369.3, First Search Report, 2 pages.
International Patent Application No. PCT/CN2020/107728, International Search Report mailed Nov. 12, 2020, 6 pages.
Chinese Patent Application No. 201910833369.3, First Office Action mailed Jun. 3, 2020, 10 pages with English Translation.
Chinese Patent Application No. 201910833369.3, Second Office Action mailed Dec. 28, 2020, 8 pages with English Translation.
Chinese Patent Application No. 201910833369.3, Supplemental Search Report, 1 page.
Notice of Reasons for Refusal issued Jul. 18, 2023 in Japanese Patent Application No. 2021-574194, with English translation (10 pages).

* cited by examiner

VIDEO DATA PROCESSING METHOD, ELECTRONIC DEVICE AND COMPUTER-READABLE MEDIUM

CROSS-REFERENCE TO RELATED APPLICATION(S)

This is a National Stage Application, filed under 35 U.S.C. 371, of International Patent Application No. PCT/CN2020/107728, filed on Aug. 7, 2020, which claims priority to a Chinese patent application No. 201910833369.3 filed with the China National Intellectual Property Administration (CNIPA) on Sep. 4, 2019, the disclosures of which are incorporated herein by reference in their entireties.

TECHNICAL FIELD

The present disclosure relates to the technical field of multimedia processing, for example, a video data processing method, an electronic device, and a computer-readable medium.

BACKGROUND

In the related art, in the process of parsing TS data packets in a transport stream (TS) file, it is usually necessary to parse all TS data packets in the TS file and cache all TS data packets in a memory, and after all TS data packets are cached, TS data packets are processed later. However, all TS data packets in the TS file are cached in the memory, not only the memory is occupied, but also the TS data packets are processed later after all TS data packets are cached, resulting in the low data processing efficiency.

SUMMARY

The purpose of the present disclosure is to improve the data processing efficiency. The present disclosure adopts the schemes described below.

A video data processing method is provided in the present disclosure. The method includes steps described below.

A to-be-processed TS file is acquired.

By means of a created stream, data in the to-be-processed TS file is read in sequence according to a set byte length, and data of each read in the to-be-processed TS file is converted into one memory stream.

When the first memory stream is obtained through conversion, memory streams are parsed in sequence according to a read order, and a video parameter corresponding to the memory streams is obtained.

In an embodiment of in the present disclosure, the TS file carries a position identity, and each piece of data with the set byte length in the TS file corresponds to one position identity; and the step of reading, by means of the created stream, the data in the to-be-processed TS file is read in sequence according to the set byte length includes reading data with the set byte length in the to-be-processed TS file in sequence based on the created stream and the position identity.

In an embodiment of the present disclosure, the method further includes a step described below.

After each read of one memory stream is completed, the one memory stream is deleted.

In an embodiment of the present disclosure, the step in which the to-be-processed TS file is acquired includes steps described below.

A to-be-processed m3u8 (moving picture experts group audio layer-3 (MP3) uniform resource locator (URL)+8-bit Unicode transformation format (UTF-8)) file is acquired.

The to-be-processed m3u8 file is parsed, and play address information of TS files corresponding to the to-be-processed m3u8 file is determined according to a parsing result.

The to-be-processed TS file is acquired according to the play address information, where the to-be-processed TS file is a file in the TS files corresponding to the to-be-processed m3u8 file.

In an embodiment of the present disclosure, the to-be-processed m3u8 file carries an identity of a file type, and the file type is an on-demand file or a live file.

When the file type is the live file, the acquired to-be-processed m3u8 file is a real-time acquired m3u8 file.

In an embodiment of the present disclosure, the method further includes a step described below.

After the video parameter corresponding to the to-be-processed TS file is obtained, a format conversion is performed on the to-be-processed TS file based on the video parameter corresponding to the to-be-processed TS file, where the video parameter corresponding to the to-be-processed TS file is a video parameter corresponding to all memory streams corresponding to the to-be-processed TS file.

A video data processing apparatus is provided in the present disclosure. The apparatus includes a TS file acquisition module, a memory stream read module and a memory stream processing module.

The TS file acquisition module is configured to acquire a to-be-processed TS file.

The memory stream read module is configured to read, by means of a created stream, data in the to-be-processed TS file in sequence according to a set byte length and convert data of each read in the to-be-processed TS file into one memory stream.

The memory stream processing module is configured to, in response to obtaining a first memory stream through conversion, parse memory streams in sequence according to a read order and obtain a video parameter corresponding to the memory streams.

In an embodiment of the present disclosure, the TS file carries a position identity, and each piece of data with the set byte length in the TS file corresponds to one position identity; and the memory stream read module is configured to, when the data in the to-be-processed TS file is read in sequence according to the set byte length and by means of the created stream, read data with the set byte length in the to-be-processed TS file in sequence based on the created stream and the position identity.

In an embodiment of the present disclosure, the apparatus further includes a deletion module.

The deletion module is configured to, after each read of one memory stream is completed, delete the corresponding one memory stream.

In an embodiment of the present disclosure, the TS file acquisition module is configured to, when the to-be-processed TS file is acquired, acquire a to-be-processed m3u8 file; parse the to-be-processed m3u8 file, and determine, according to a parsing result, play address information of TS files corresponding to the to-be-processed m3u8 file; and acquire the to-be-processed TS file according to the play address information, where the to-be-processed TS file is a file in the TS files corresponding to the to-be-processed m3u8 file.

In an embodiment of in the present disclosure, the to-be-processed m3u8 file carries an identity of a file type, and the file type is an on-demand file or a live file.

When the file type is the live file, the acquired to-be-processed m3u8 file is a real-time acquired m3u8 file.

In an embodiment of the present disclosure, the apparatus further includes a format conversion module.

The format conversion module is configured to, after a video parameter corresponding to the to-be-processed TS file is obtained, perform a format conversion on the to-be-processed TS file based on the video parameter corresponding to the to-be-processed TS file, where the video parameter corresponding to the to-be-processed TS file is a video parameter corresponding to all memory streams corresponding to the to-be-processed TS file.

The present disclosure further provides an electronic device. The electronic device includes a processor and a memory.

The memory is configured to store a computer operation instruction.

The processor is configured to perform the method of any one of method embodiments by invoking the computer operation instruction.

A computer-readable medium is provided in the present disclosure and stores at least one instruction, at least one program, a code set or an instruction set, and at least one instruction, at least one program, the code set or the instruction set is loaded and executed by a processor to implement the method of any one of method embodiments.

Schemes provided in the embodiments of the present disclosure have the following beneficial effects.

In the video data processing method and apparatus, the electronic device and the computer-readable medium of the embodiments of the present disclosure, since the created stream is unidirectional and irreversible, data of each read in the to-be-processed TS file may be converted into one memory stream based on the created stream in the process of reading the data in the to-be-processed TS file in sequence according to the set byte length, each memory stream corresponds to one TS data packet, and when the first memory stream is obtained, memory streams may be parsed in sequence according to the read order, i.e., to simultaneously read a TS file and process a read TS data packet based on the stream, improving data processing efficiency.

BRIEF DESCRIPTION OF DRAWINGS

To illustrate the technical schemes in the embodiments of the present disclosure more clearly, the drawings used in the embodiments of the present disclosure will be described below.

DETAILED DESCRIPTION

Figure 1:
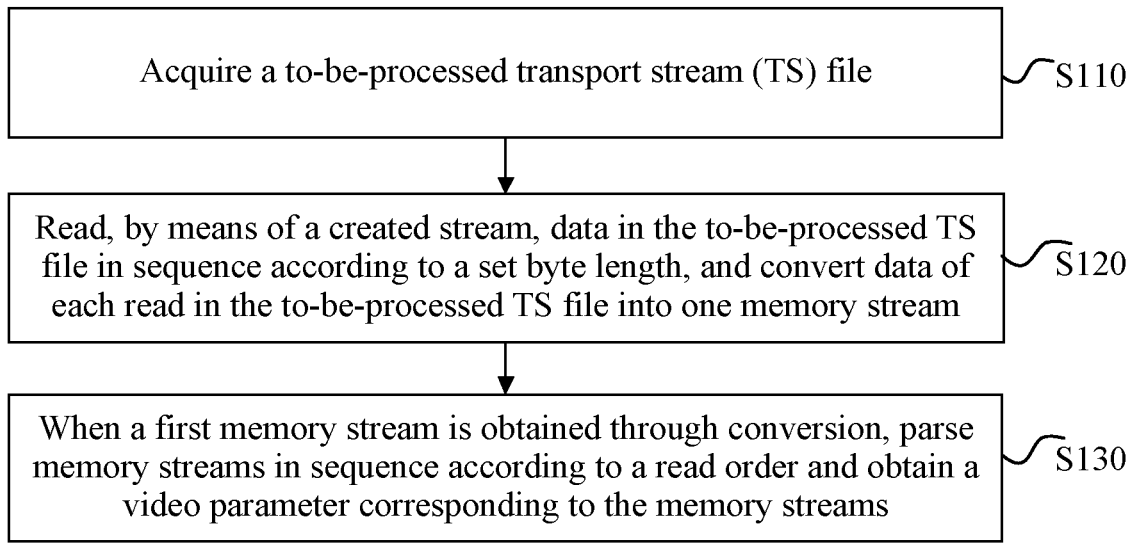
FIG. 1 is a flowchart of a video data processing method according to an embodiment of the present disclosure.

Embodiments of the present disclosure will be described in detail with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and embodiments of the present disclosure are merely for illustrative purposes and are not intended to limit the scope of the present disclosure.

It is to be understood that the various steps recited in the method embodiments of the present disclosure may be performed in a different order, and/or in parallel. In addition, the method embodiments may include additional steps and/or omit performing the illustrated steps. The scope of the present disclosure is not limited in this respect.

As used herein, the term "comprise" and variations thereof are intended to be inclusive, that is, "comprises, but does not limited to". The term "based on" is "at least partially based on". The term "one embodiment" means "at least one embodiment"; the term "another embodiment" means "at least one another embodiment"; the term "some embodiments" means "at least some embodiments". Related definitions of other terms will be given in the following description.

It is to be noted that references to "first", "second" and the like in the present disclosure are merely intended to distinguish apparatuses, modules, or units and are not intended to limit that the apparatuses, modules or units must be different apparatuses, modules or units, nor intended to limit the order or interrelationship of the functions performed by the apparatuses, modules, or units.

It is to be noted that references to modifications of "one" or "a plurality" in the present disclosure are intended to be illustrative and not limiting, and that those skilled in the art should understand that "one or more" are intended unless the context clearly indicates otherwise.

The names of messages or information exchanged between multiple devices in the embodiments of the present disclosure are only for illustrative purposes and are not intended to limit the scope of such messages or information.

The schemes of the present disclosure and how the technical schemes of the present disclosure solve the above technical issues are described in detail in the embodiments described below. The embodiments described below may be combined with one another, and identical or similar concepts or processes may not be repeated in some embodiments. The embodiments of the present disclosure are described below in conjunction with the drawings.

An embodiment of the present disclosure provides a video data processing method. As shown in FIG. 1, the method may include steps described below.

In step S110, a to-be-processed TS file is acquired.

The TS file is a video segment with fixed duration. One TS file may include a plurality of TS data packets, and the TS file includes at least one of videos or audios.

In step S120, by means of a created stream, data in the to-be-processed TS file is read in sequence according to the set byte length, and data of each read in the to-be-processed TS file is converted into one memory stream.

The stream is irreversible. When the data in the to-be-processed TS file (for the convenience of description, the transport stream (TS) file is referred to as the TS file for short) is read in sequence according to the set byte length, one piece of data with the set byte length in the to-be-processed TS file may be read each time, and the one piece of data with the set byte length is stored in a memory, that is, the one piece of data with the set byte length is converted into a memory stream. The set byte length is usually set to 188 bytes, that is, one TS data packet is usually 188 bytes.

In step S130, when the first memory stream is obtained through conversion, memory streams are parsed in sequence according to a read order, and a video parameter corresponding to the memory streams is obtained.

When the first memory stream is obtained, the first memory stream may be parsed, that is, a memory stream is read while the read memory stream is parsed simultaneously, and the parsed video parameter may be used for subsequent processing of the TS file, for example, the parsed video parameter may be used for performing the format conversion on the TS file, so that the TS file may be played by a player. If the format conversion is performed on the TS file based on hyper text transfer protocol (HTTP) live streaming (HLS) protocol, the video parameter may include decoding time stamp (DTS), presentation time stamp (PTS), sequence parameter set (SPS) and picture parameter set (PPS).

In the scheme of the embodiments of the present disclosure, since the created stream is unidirectional and irreversible, data of each read in the to-be-processed TS file may be converted into one memory stream based on the created stream in the process of reading the data in the to-be-processed TS file in sequence according to the set byte length, each memory stream corresponds to one TS data packet, and when the first memory stream is obtained, it is possible to parse the memory streams in sequence according to the read order, i.e., to simultaneously read a TS file and process a read TS data packet based on the stream, improving data processing efficiency.

In an embodiment of the present disclosure, the TS file carries a position identity, and each piece of data with the set byte length in the TS file corresponds to one position identity; and step S120 in which the data in the to-be-processed TS file is read in sequence according to the set byte length and by means of the created stream includes that data with the set byte length in the to-be-processed TS file is read in sequence based on the created stream and the position identity.

By means of the created stream, in the process of reading the data in the to-be-processed TS file in sequence according to the set byte length, the data in the to-be-processed TS file may be more accurately read by identifying the progress of reading the data through the position identity carried in the TS file. The position identity may be represented by one identity bit, such as position. The start position of the to-be-processed TS file is 0, and data with one set byte length is read every time and the position identity correspondingly changes, such as (position+set byte length). As an example, the set byte length is set to 188 bytes, the corresponding position identity is (position+188) after the first data with the set byte length is read, the corresponding position identification is (position+188+188) after the second data with the set byte length is read, and the position identity is only added but not subtracted, therefore, the data in the to-be-processed TS file can be accurately read based on the position identity.

In an embodiment of the present disclosure, the method may further include the step described below.

After each read of one memory stream is completed, the corresponding one memory stream is deleted.

When the to-be-processed TS file is read to obtain the corresponding first memory stream, the first memory stream may be parsed without waiting for all memory streams to be read before the memory streams are parsed, thereby improving the data processing efficiency. After one memory stream is read, the corresponding memory stream may be deleted; that is, the memory stream may be read and the corresponding memory stream may be deleted at the same time, so as to ensure enough space in the memory to store the read memory streams. When the to-be-processed TS file includes a large amount of data, the normal reading of the memory stream can still be ensured, that is, the memory capacity may be smaller than the magnitude of the memory occupied by the data in the to-be-processed TS file.

In an embodiment of the present disclosure, the step S110 in which the to-be-processed TS file is acquired may include steps described below.

A to-be-processed m3u8 file is acquired.

The to-be-processed m3u8 file is parsed, and play address information of TS files corresponding to the to-be-processed m3u8 file is determined according to a parsing result.

The to-be-processed TS file is acquired according to the play address information, where the to-be-processed TS file is a file in the TS files corresponding to the to-be-processed m3u8 file.

The m3u8 file is a plain text file, the m3u8 file may be from the network, and the m3u8 file may correspond to the live file and/or the on-demand file. After the to-be-processed m3u8 file is acquired, the to-be-processed m3u8 file may be parsed to acquire the corresponding TS file (e.g., the corresponding TS file may be one or more TS files), where the m3u8 file may be parsed by parsing a regular expression.

The m3u8 file may also carry an index in which each TS file and play address information corresponding to each TS file are identified, and each TS file corresponds to one piece of play address information. When the to-be-processed m3u8 file is parsed to acquire the corresponding TS file, the to-be-processed TS file may be acquired based on the index. The play address information is online play address corresponding to the TS file, and the TS file corresponding to the play address information may be played based on the play address information. Before the TS file is played, the format conversion is performed on the TS file so that the format of the TS file conforms to the play format requirements of the player.

The to-be-processed TS file may be any one or several of the TS files corresponding to the to-be-processed m3u8 file, or may also be one of the TS files determined based on the play request of a user. The play request may be a link request sent by the user to a server through a terminal and represents that the user wants to play one or more TS files corresponding to a certain m3u8 file. The play request may include an identity of the m3u8 file, and the server knows which m3u8 file the user wants to play based on the identity.

If the m3u8 file corresponds to a plurality of TS files, and the play address information corresponding to the plurality of TS files may further include a play order. According to the play order, the plurality of TS files may be played based on the address information corresponding to each TS file.

In an embodiment of the present disclosure, the m3u8 file carries an identity of a file type, and the file type is an on-demand file or a live file.

When the file type is the live file, the acquired to-be-processed m3u8 file is a real-time acquired m3u8 file.

When the m3u8 file is parsed, the m3u8 file carries an identity for identifying the file type of the m3u8 file, and the identity may be a certain field in the m3u8 file. The file type of the m3u8 file may be determined through the field, that is, whether the m3u8 file corresponds to the on-demand file or the live file. In an embodiment, the file type of the m3u8 file is the same as that of the parsed TS file, the m3u8 file is the on-demand file, the parsed TS file is also the on-demand file; and the m3u8 file is the live file, and the parsed TS file is also the live file.

If the file type of the m3u8 file is the on-demand file, content of the m3u8 file are unchanged. If the file type of the m3u8 file is the live file, content of the m3u8 file is constantly changed, that is, new content is constantly added to the m3u8 file, so it is necessary to obtain the m3u8 file in real time and parse the m3u8 file in real time to obtain the corresponding TS file. Therefore, if the file type of the m3u8 file is the on-demand file, the number of TS files obtained by parsing the m3u8 file is fixed, and if the file type of the m3u8 file is the live file, the number of TS files obtained by parsing the m3u8 file is changed in real time.

It is to be noted that when the m3u8 file is parsed, not only the file type of the m3u8 file may be obtained, but also duration of each TS file parsed out may be obtained.

In the embodiment of the present disclosure, after the video parameter corresponding to the to-be-processed TS file is obtained, the method may further include the step described below.

A format conversion is performed on the to-be-processed TS file based on the video parameter corresponding to the to-be-processed TS file, where the video parameter corresponding to the to-be-processed TS file is a video parameter corresponding to all memory streams corresponding to the to-be-processed TS file.

The TS file is a dedicated video format of some mobile device browser for caching a video. The common player can't play the video normally, the video needs to be transcoded before being played. Therefore, the to-be-processed TS file may be converted into a file with a set format based on the video parameter corresponding to the to-be-processed TS file, where the set format is a format of a playable file corresponding to the player. For example, an fmp4 format is a video format that can be directly played by the common player on the mobile device, so that the TS file may be transcoded into the format compatible with the common player, that is, the fmp4 format, then the transcoded TS file format is compatible with the play format of the player, and the file with the set format may be directly played by the player.

In the embodiment of the present disclosure, after the format conversion is performed on the to-be-processed TS file, the method may further include the steps described below.

The play request of the to-be-processed m3u8 file and the format converted TS file are acquired.

The play address information corresponding to each TS file of the to-be-processed m3u8 file is determined.

Format converted TS files corresponding to a plurality of pieces of play address information are played in sequence according to the play order corresponding to the plurality of pieces of play address information.

After the format conversion is performed on the TS files, the file format of the converted TS files may correspond to the play format of the player, and the corresponding format converted TS files may be played according to the play order corresponding to the play address information to achieve the playing of the TS files, where the played TS files may be any one or several of the TS files corresponding to the m3u8 file.

Figure 2:
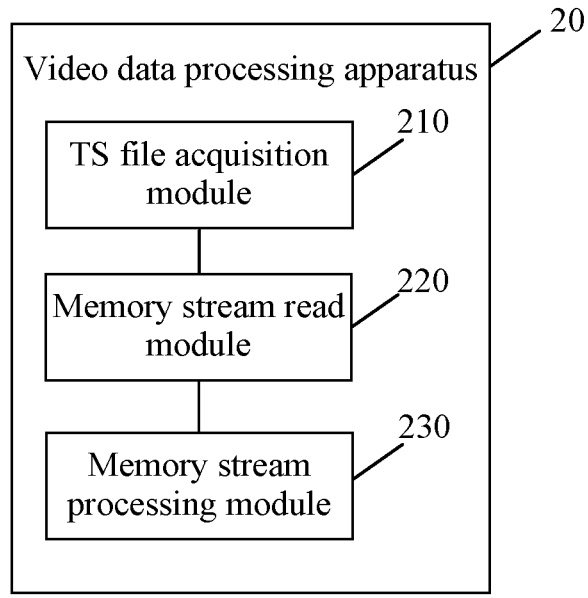
FIG. 2 is a structure diagram of a video data processing apparatus according to an embodiment of the present disclosure.

Based on the same principle as the video data processing method shown in FIG. 1, the embodiments of the present disclosure further provide a video data processing apparatus 20. As shown in FIG. 2, the apparatus may include a TS file acquisition module 210, a memory stream read module 220 and a memory stream processing module 230.

The TS file acquisition module 210 is configured to acquire a to-be-processed TS file.

The memory stream read module 220 is configured to read, by means of a created stream, data in the to-be-processed TS file in sequence according to a set byte length and convert data of each read in the to-be-processed TS file into a memory stream.

The memory stream processing module 230 is configured to parse memory streams in sequence according to a read order and obtain a video parameter corresponding to the memory streams, when the first memory stream is obtained through conversion.

In the scheme of the embodiments of the present disclosure, since the created stream is unidirectional and irreversible, in the process of reading the data in the to-be-processed TS file in sequence according to the set byte length, the data of each read in the to-be-processed TS file may be converted into one memory stream based on the created stream, each memory stream corresponds to one TS data packet, and when the first memory stream is obtained, it is possible to parse the memory streams in sequence according to a read order, i.e., to simultaneously read a TS file and process a read TS data packet based on the stream, improving the data processing efficiency.

In an embodiment of the present disclosure, the TS file carries a position identity, and each piece of data with the set byte length in the TS file corresponds to one position identity; and the memory stream read module 220 is configured to, when the data in the to-be-processed TS file is read in sequence according to the set byte length and by means of the created stream, read data with the set byte length in the to-be-processed TS file in sequence based on the created stream and the position identity.

In an embodiment of the present disclosure, the apparatus may further include a deletion module.

The deletion module is configured to, after each read of one of the memory streams is completed, delete the corresponding memory stream.

In an embodiment of the present disclosure, the TS file acquisition module 210 is configured to, when the to-be-processed TS file is acquired, acquire a to-be-processed m3u8 file; parse the to-be-processed m3u8 file, determine, according to a parsing result, play address information of each TS file corresponding to the to-be-processed m3u8 file; and acquire the to-be-processed TS file according to the play address information, where the to-be-processed TS file is a file in TS files corresponding to the to-be-processed m3u8 file.

In an embodiment of the present disclosure, the m3u8 file carries an identity of a file type, and the file type is an on-demand file or a live file.

When the file type is the live file, the acquired to-be-processed m3u8 file is a real-time acquired m3u8 file.

In an embodiment of the present disclosure, the apparatus may further include a format conversion module.

The format conversion module is configured to, after the video parameter corresponding to the to-be-processed TS file is obtained, perform a format conversion on the to-be-processed TS file based on the video parameter corresponding to the to-be-processed TS file, where the video parameter corresponding to the to-be-processed TS file is a video parameter corresponding to all memory streams corresponding to the to-be-processed TS file.

The apparatus provided by the embodiments of the present disclosure may execute the video data processing method shown in FIG. 1, and the implementation principle is similar. Actions executed by the plurality of modules in the video data processing apparatus in the embodiments of the present disclosure correspond to steps in the video data processing method in the embodiments of the present disclosure. For the detailed functional description of modules in the video data processing apparatus, please refer to the description of the corresponding video data processing method described in the foregoing, and which will not be repeated herein.

Figure 3:
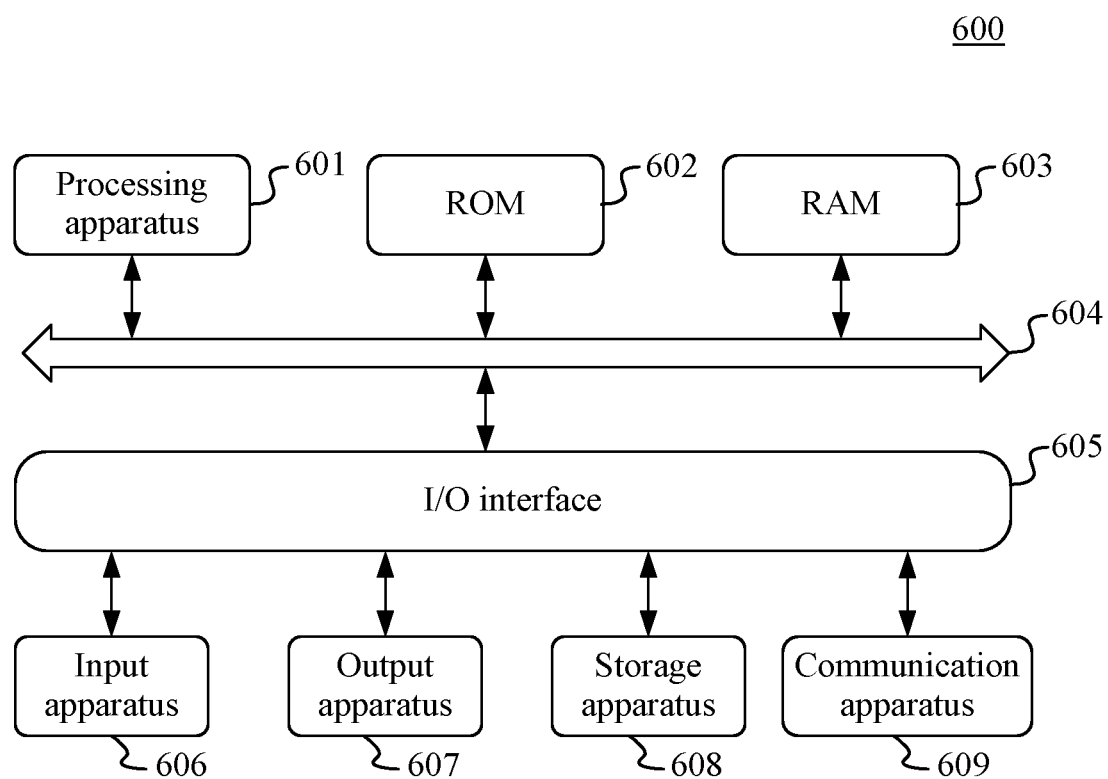
FIG. 3 is a structure diagram of an electronic device according to embodiments of the present disclosure.

Based on the same principles as the method in the embodiments of the present disclosure, referring to FIG. 3, FIG. 3 shows a structure diagram of an electronic device 600 (such as a terminal or a server in FIG. 1) 600 applicable to implementing the embodiments of the present disclosure. A terminal device in the embodiments of the present disclosure may include, but is not limited to, a mobile terminal such as a mobile phone, a laptop, a digital play receiver, a personal digital assistant (PDA), a PAD, a portable media player (PMP) and a vehicle-mounted terminal (such as a vehicle-mounted navigation terminal), and a fixed terminal such as a digital television (TV) and a desktop computer. The electronic device shown in FIG. 3 is merely an example and is not intended to limit the function and usage scope of the embodiments of the present disclosure.

The electronic device includes a memory and a processor, where the processor may be referred to as a processing apparatus 601 hereinafter, and the memory may include at least one of a read-only memory (ROM) 602, a random access memory (RAM) 603 or a storage apparatus 608 hereinafter, which are described as follows.

As shown in FIG. 3, the electronic device 600 may include the processing apparatus 601 (such as a central processor and a graphics processor). The processing apparatus 602 may perform various types of appropriate operations and processing based on a program stored in the read-only memory (ROM) 608 or a program loaded from the storage apparatus 608 to a random-access memory (RAM) 603. Various programs and data required for the operation of the electronic device 600 are also stored in the RAM 603. The processing apparatus 601, the ROM 602 and the RAM 603 are connected to each other through a bus 604. An input/output (I/O) interface 605 is also connected to the bus 604.

Generally, the following apparatus may be connected to the I/O interface 605: an input apparatus 606 such as a touch screen, a touch pad, a keyboard, a mouse, a camera, a microphone, an accelerometer and a gyroscope; an output apparatus 607 such as a liquid-crystal display (LCD), a speaker, and a vibrator; the storage apparatus 608 such as a magnetic tape and a hard disk; and a communication apparatus 609. The communication apparatus 609 may allow the electronic device 600 to perform wireless or wired communication with other devices to exchange data. Although FIG. 3 shows the electronic device 600 having various apparatuses, it is to be understood that not all of the apparatuses shown herein need to be implemented or present. Alternatively, more or fewer apparatuses may be implemented or present.

Particularly, according to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the method of the embodiments of the present disclosure are performed.

It is to be noted that the computer-readable medium described above in the present disclosure may be a computer-readable signal medium or a computer-readable storage medium or any combination thereof. The computer-readable storage medium may be, but is not limited to, an electrical, magnetic, optical, electromagnetic, infrared, or semiconductor system, apparatus, or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier wave, and computer-readable program codes are carried in the data signal. The data signal propagated in this manner may be in multiple forms and includes, but is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as hyper text transfer protocol (HTTP), and may be interconnected with any form or medium of digital data communication (such as a communication network). Examples of the communication network include a local area network (LAN), a wide area networks (WAN), an internet (such as the Internet), and a peer-to-peer network (such as an Ad-Hoc network), as well as any currently known or future developed network.

The computer-readable medium may be included in the electronic device or may exist alone without being assembled into the electronic device.

The computer-readable medium carries one or more programs, when the one or more programs are executed by the electronic device, the electronic device is caused to acquire a to-be-processed TS file; by means of a created stream, read data in the to-be-processed TS file in sequence according to a set byte length, and convert data of each read in the to-be-processed TS file into a memory stream; and when a first memory stream is obtained through conversion, parse memory streams in sequence according to a read order, and obtain a video parameter corresponding to the memory streams.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, partly on the user computer, as a stand-alone software package, partly on the user computer and partly on a remote computer, or entirely on the remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent one module, program segment, or part of codes. The module, program segment, or part of codes includes one or more executable instructions for implementing specified logical functions. It is also to be noted that in some alternative implementations, the functions in the blocks may occur in sequences different from those shown in the drawings. For example, two successive blocks may in fact be executed substantially at the same time or in reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The modules or units involved in the embodiments of the present disclosure may be implemented by software or hardware. The names of the modules or units do not constitute a limitation on the units themselves. For example, a memory stream read module may also be described as "a TS data packet read module".

The functions described above herein may be performed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

One or more embodiments of the present disclosure provide a video data processing method. The method includes steps described below.

A to-be-processed TS file is acquired.

By means of a created stream, data in the to-be-processed TS file is read in sequence according to a set byte length, and data of each read in the to-be-processed TS file is converted into one memory stream.

When the first memory stream is obtained through conversion, memory streams are parsed in sequence according to the read order, and a video parameter corresponding to the memory streams is obtained.

In one or more embodiments of the present disclosure, the TS file carries a position identity, and each piece of data with the set byte length in the TS file corresponds to one position identity; and the step of reading, by means of the created stream, the data in the to-be-processed TS file in sequence according to the set byte length includes reading data with the set byte length in the to-be-processed TS file in sequence based on the created stream and the position identity.

In one or more embodiments of the present disclosure, the method further includes a step described below.

After each read of one memory stream is completed, the corresponding one memory stream is deleted.

In one or more embodiments of the present disclosure, acquiring the to-be-processed TS file includes steps described below.

A to-be-processed m3u8 file is acquired.

The to-be-processed m3u8 file is parsed, and play address information of TS files corresponding to the to-be-processed m3u8 file is determined according to a parsing result.

The to-be-processed TS file is acquired according to the play address information, where the to-be-processed TS file is a file in the TS files corresponding to the to-be-processed m3u8 file.

In one or more embodiments of the present disclosure, the m3u8 file carries an identity of a file type, and the file type is an on-demand file or a live file.

When the file type is the live file, the acquired to-be-processed m3u8 file is a real-time acquired m3u8 file.

In one or more embodiments of the present disclosure, after the video parameter corresponding to the to-be-processed TS file is obtained, the method further includes a step described below.

A format conversion is performing on the to-be-processed TS file based on the video parameter corresponding to the to-be-processed TS file, where the video parameter corresponding to the to-be-processed TS file is a video parameter corresponding to all memory streams corresponding to the to-be-processed TS file.

In one or more embodiments of the present disclosure, the video data processing apparatus is provided and includes a TS file acquisition module, a memory stream read module and a memory stream processing module.

The TS file acquisition module is configured to acquire a to-be-processed TS file.

The memory stream read module is configured to read, by means of a created stream, data in the to-be-processed TS file in sequence according to a set byte length and convert data of each read in the to-be-processed TS file into one memory stream.

The memory stream processing module is configured to, when a first memory stream is obtained through conversion, parse memory streams in sequence according to a read order and obtain a video parameter corresponding to the memory streams.

In one or more embodiments of the present disclosure, the TS file carries a position identity, and each piece of data with the set byte length in the TS file corresponds to one position identity; and the memory stream read module is configured to, when the data in the to-be-processed TS file is read in sequence according to the set byte length and by means of the created stream, read data with the set byte length in the to-be-processed TS file in sequence based on the created stream and the position identity.

In one or more embodiments of the present disclosure, the apparatus further includes a deletion module.

The deletion module is configured to, after each read of one memory stream is completed, delete the one memory stream.

In one or more embodiments of the present disclosure, the TS file acquisition module is configured to, when the to-be-processed TS file is acquired, acquire a to-be-processed m3u8 file; parse the to-be-processed m3u8 file, and determine, according to a parsing result, play address information of TS files corresponding to the to-be-processed m3u8 file; and acquire the to-be-processed TS file according to the play address information, where the to-be-processed TS file is a file in the TS files corresponding to the to-be-processed m3u8 file.

In one or more embodiments of the present disclosure, the m3u8 file carries an identity of a file type, and the file type is an on-demand file or a live file.

When the file type is the live file, the acquired to-be-processed m3u8 file is a real-time acquired m3u8 file.

In one or more embodiments of the present disclosure, the apparatus further includes a format conversion module.

The format conversion module is configured to perform, after a video parameter corresponding to the to-be-processed TS file is obtained, a format conversion on the to-be-processed TS file based on the video parameter corresponding to the to-be-processed TS file, where the video parameter corresponding to the to-be-processed TS file is a video parameter corresponding to all memory streams corresponding to the to-be-processed TS file.

The above description is merely illustrative of exemplary embodiments of the present disclosure and the technical principles used therein. Those of ordinary skill in the art should understand that the scope referred to in the disclosure is not limited to the schemes formed by the particular combination of the features described above, but intended to cover other embodiments which may be formed by any combination of the features described above or their equivalents without departing from the concept of the disclosure. For example, schemes formed by mutual substitutions of the features described above and the features disclosed in the present disclosure (but not limited to) that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable sub-combination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A video data processing method, comprising:
   acquiring a to-be-processed transport stream (TS) file;
   reading, by means of a created stream, data in the to-be-processed TS file in sequence according to a set byte length, and converting data of each read in the to-be-processed TS file into one memory stream; and
   in response to obtaining a first memory stream through conversion, parsing memory streams in sequence according to a read order, and obtaining a video parameter corresponding to the memory streams,
   wherein the TS file carries a position identity, and each piece of data with the set byte length in the TS file corresponds to one position identity, and
   wherein reading the data in the to-be-processed TS file comprises:
   reading data with the set byte length in the to-be-processed TS file in sequence based on the created stream and the position identity.

2. The method of claim 1, further comprising:
   after each read of one memory stream is completed, deleting the corresponding one memory stream.

3. The method of claim 1, wherein acquiring the to-be-processed TS file comprises:
   acquiring a to-be-processed m3u8 file;
   parsing the to-be-processed m3u8 file, and determining, according to a parsing result, play address information of TS files corresponding to the to-be-processed m3u8 file; and
   acquiring the to-be-processed TS file according to the play address information, wherein the to-be-processed TS file is a file in the TS files corresponding to the to-be-processed m3u8 file.

4. The method of claim 3, wherein the to-be-processed m3u8 file carries an identity of a file type, and the file type is an on-demand file or a live file; and
   in a case where the file type is the live file, the acquired to-be-processed m3u8 file is a real-time acquired m3u8 file.

5. The method of claim 1, further comprising: after the video parameter corresponding to the to-be-processed TS file is obtained,
   performing a format conversion on the to-be-processed TS file based on the video parameter corresponding to the to-be-processed TS file, wherein the video parameter corresponding to the to-be-processed TS file is a video parameter corresponding to all memory streams corresponding to the to-be-processed TS file.

6. An electronic device, comprising:
   a memory, which is configured to store a computer operation instruction; and
   a processor, which is configured to execute the computer operation instruction to perform the following steps:
   acquiring a to-be-processed transport stream (TS) file;
   reading, by means of a created stream, data in the to-be-processed TS file in sequence according to a set byte length, and converting data of each read in the to-be-processed TS file into one memory stream; and in response to obtaining a first memory stream through conversion, parsing memory streams in sequence according to a read order, and obtaining a video parameter corresponding to the memory streams, wherein the TS file carries a position identity, and each piece of data with the set byte length in the TS file corresponds to one position identity, and wherein the processor is configured to perform reading the data in the to-be-processed TS file by:

reading data with the set byte length in the to-be-processed TS file in sequence based on the created stream and the position identity.

7. A non-transitory computer-readable medium storing at least one instruction, at least one program, a code set or an instruction set, wherein the at least one instruction, the at least one program, the code set or the instruction set is loaded and executed by a processor to implement the following steps:

acquiring a to-be-processed transport stream (TS) file;

reading, by means of a created stream, data in the to-be-processed TS file in sequence according to a set byte length, and converting data of each read in the to-be-processed TS file into one memory stream; and in response to obtaining a first memory stream through conversion, parsing memory streams in sequence according to a read order, and obtaining a video parameter corresponding to the memory streams, wherein the TS file carries a position identity, and each piece of data with the set byte length in the TS file corresponds to one position identity, and wherein the processor is configured to perform reading the data in the to-be-processed TS file by:

reading data with the set byte length in the to-be-processed TS file in sequence based on the created stream and the position identity.

8. The electronic device of claim 6, wherein the processor is further configured to perform:

after each read of one memory stream is completed, deleting the corresponding one memory stream.

9. The electronic device of claim 6, wherein the processor is configured to perform acquiring the to-be-processed TS file by:

acquiring a to-be-processed m3u8 file;

parsing the to-be-processed m3u8 file, and determining, according to a parsing result, play address information of TS files corresponding to the to-be-processed m3u8 file; and acquiring the to-be-processed TS file according to the play address information, wherein the to-be-processed TS file is a file in the TS files corresponding to the to-be-processed m3u8 file.

10. The electronic device of claim 9, wherein the to-be-processed m3u8 file carries an identity of a file type, and the file type is an on-demand file or a live file; and in a case where the file type is the live file, the acquired to-be-processed m3u8 file is a real-time acquired m3u8 file.

11. The electronic device of claim 6, wherein the processor is further configured to perform the following step:

after the video parameter corresponding to the to-be-processed TS file is obtained, performing a format conversion on the to-be-processed TS file based on the video parameter corresponding to the to-be-processed TS file, wherein the video parameter corresponding to the to-be-processed TS file is a video parameter corresponding to all memory streams corresponding to the to-be-processed TS file.

12. The medium of claim 7, wherein the TS file carries a position identity, and each piece of data with the set byte length in the TS file corresponds to one position identity; and wherein the at least one program, the code set or the instruction set is loaded and executed by a processor to implement reading the data in the to-be-processed TS file by:

reading data with the set byte length in the to-be-processed TS file in sequence based on the created stream and the position identity.

13. The medium of claim 7, wherein the at least one program, the code set or the instruction set is loaded and executed by a processor to further implement:

after each read of one memory stream is completed, deleting the corresponding one memory stream.

14. The medium of claim 7, wherein the at least one program, the code set or the instruction set is loaded and executed by a processor to implement acquiring the to-be-processed TS file by:

acquiring a to-be-processed m3u8 file;

parsing the to-be-processed m3u8 file, and determining, according to a parsing result, play address information of TS files corresponding to the to-be-processed m3u8 file; and acquiring the to-be-processed TS file according to the play address information, wherein the to-be-processed TS file is a file in the TS files corresponding to the to-be-processed m3u8 file.

15. The medium of claim 14, wherein the to-be-processed m3u8 file carries an identity of a file type, and the file type is an on-demand file or a live file; and in a case where the file type is the live file, the acquired to-be-processed m3u8 file is a real-time acquired m3u8 file.

16. The medium of claim 7, wherein the at least one program, the code set or the instruction set is loaded and executed by a processor to further implement:

after the video parameter corresponding to the to-be-processed TS file is obtained, performing a format conversion on the to-be-processed TS file based on the video parameter corresponding to the to-be-processed TS file, wherein the video parameter corresponding to the to-be-processed TS file is a video parameter corresponding to all memory streams corresponding to the to-be-processed TS file.

* * * * *